Figure 1:
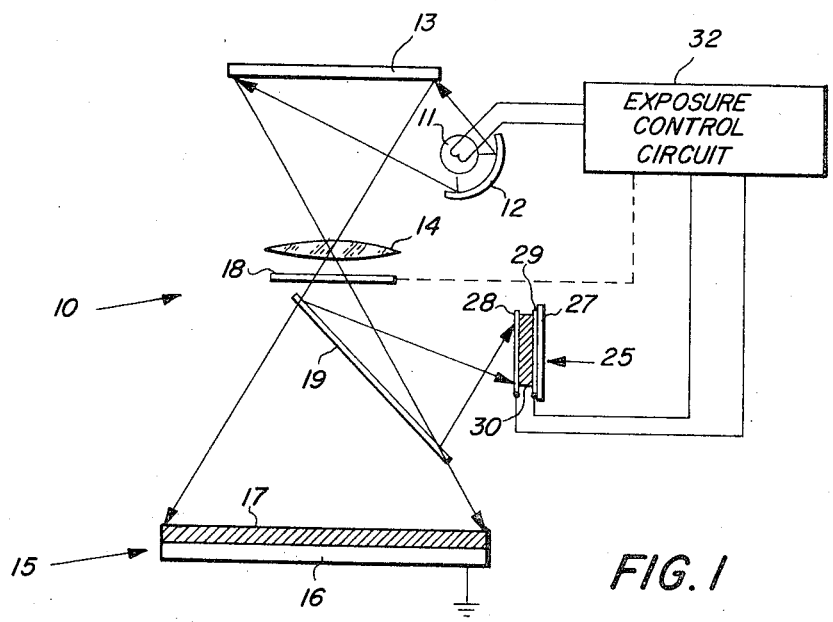

# United States Patent [19]

Morse et al.

[11] 3,743,405
[45] July 3, 1973

[54] AUTOMATIC EXPOSURE CONTROL IN ELECTROPHOTOGRAPHY

[75] Inventors: Theodore H. Morse; Joseph Y. Kaukeinen, both of Rochester, N.Y.

[73] Assignee: Eastman Kodak Company, Rochester, N.Y.

[22] Filed: June 17, 1971

[21] Appl. No.: 154,117

Related U.S. Application Data

[63] Continuation-in-part of Ser. No. 63,385, Aug. 13, 1970, abandoned.

[52] U.S. Cl............................ 355/3, 355/68, 355/83
[51] Int. Cl............................................. G03g 15/00
[58] Field of Search................... 355/3, 68, 83; 96/1

[56] References Cited
UNITED STATES PATENTS

| 3,423,153 | 1/1969 | Kent | 355/68 X |
| 3,438,704 | 4/1969 | Schoen | 355/68 |

Primary Examiner—John M. Horan
Attorney—Robert W. Hampton et al.

[57] ABSTRACT

An exposure control device adapted for use in electrographic copiers. The device comprises a radiation-sensitive control element fabricated from the same radiation-sensitive material as that which comprises the radiation-sensitive layer of the electrographic recording plate, thereby assuring proper plate exposure regardless of changes in the spectral distribution of energy emanating from the illuminated original or in the electrographic plate speed as the ambient operating temperature varies.

5 Claims, 4 Drawing Figures

THEODORE H. MORSE
JOSEPH Y. KAUKEINEN
INVENTORS

THEODORE H. MORSE
JOSEPH Y. KAUKEINEN
INVENTORS

BY

AUTOMATIC EXPOSURE CONTROL IN ELECTROPHOTOGRAPHY

This invention relates to electography and, more particularly, to a method and apparatus for automatically adjusting the exposure of the electrographic recording element to compensate for variations in apparent brightness of the original document being copied. This application is a continuation-in-part of our copending application Ser. No. 63,385, filed Aug. 13, 1970 and now abandoned.

Document and microfilm copying via the electrographic process is, of course, well known. Briefly and generally stated, such a process comprises the steps of imagewise exposing the uniformly charged radiation-sensitive surface of an electrographic plate to activating radiation to form a latent electrostatic image of the document or microfilm indicia thereon; developing the latent image by applying colored electroscopic particles or "toner" thereto; and fusing the toner to the toner-bearing surface of the electrographic plate to produce a permanent image. Usually, particularly in modern high-speed automatic copiers, the toner image is transferred, prior to being fused to the electrographic plate surface, to a paper receiving sheet whereon it is subsequently fused. In this manner, the electrographic plate can be recycled through the process to produce a multitude of copies.

During the imagewise exposure step, the original is commonly illuminated by radiation emanating from one or more incandescent lamps or other sources of electromagnetic radiation to which the plate is sensitive, and an image of the original is projected on the charged electrographic plate. Plate exposure is governed to a great extent by the apparent brightness of the illuminated original which, in turn, is dependent upon its reflectivity, background color and density, as well as the intensity and spectral characteristics of the source of document illumination. Thus, to consistently produce high quality copies, it is essential that electrographic copiers be equipped with some means for varying plate exposure to compensate for such variations in brightness of the original documents.

In U.S. Pat. No. 3,423,153, there is disclosed an electro-optical device adapted for use in electrographic copiers for automatically varying the intensity of the source of document illumination in accordance with the apparent brightness of the document being copied. A simple photocell, positioned to receive light reflected from the original document during plate exposure, is used to control the electrical energy applied to the illuminating source.

A common deficiency of an exposure control device of the type described above, however, is its inability to properly adjust plate exposure to compensate for color variations, from document to document, in the background color of the original document. This deficiency stems from the fact that the photocell or other radiation-sensitive control element used for sensing the brightness of the original usually has a spectral response substantially different from that of the electrographic plate. Thus, the plate and exposure control element respond differently to documents of different colors, causing the exposure control device to improperly adjust plate exposure.

Another deficiency of exposure control devices in which the spectral response of the radiation-sensitive control element substantially differs from that of the electrographic plate is the inability of such devices to properly adjust exposure when the color temperature of the illuminating source varies from the color temperature at which the device was calibrated. When the color temperature of the illuminating source varies, the spectral distribution of energy emanating therefrom shifts which, in turn, causes the spectral distribution of the illuminated original to shift. The latter shift can, of course, produce improper adjustment to plate whenever the exposure control element and the plate have differing spectral responses.

An object of the present invention, therefore, is to provide an exposure control apparatus adapted for use in electrographic copiers for providing proper plate exposure, notwithstanding changes from document to document, in the color of background areas.

Another object of the invention is to provide a novel apparatus for controlling the intensity of the source of document illumination in an electrographic copier in accordance with the average brightness of the original document or film being reproduced.

Another object of the invention is to provide a unique apparatus for controlling exposure time of an electrographic plate in accordance with the average brightness of the original document or film being copied.

Still another object of the invention is to provide an automatic exposure control device which is adapted for use in electrographic copiers and has a spectral response identical to that of the electrographic plate.

Yet another object of the invention is to provide an automatic exposure control device which is adapted for use in electrographic copiers and is capable of automatically adjusting the exposure of the electrographic plate to compensate for variations in color temperature of the source of illumination.

A further object of the invention is to provide a method of controlling the exposure of an electrographic plate to compensate for variations in brightness of the original document or film being reproduced, as well as variations in color temperature of the source of illumination.

These and other objects of the invention and its various advantages are accomplished by the use of a unitary exposure control element comprising a radiation-sensitive material, such as a photoconductor, disposed between two conducting layers which are electrically biased with respect to each other, and at least one of which is transparent to radiation from the illuminating source. The radiation-sensitve material comprising the control element is selected to possess substantially the same spectral response as that of the electrographic plate and preferably comprises the same radiation-sensitive material from which the electrographic plate is fabricated. By fabricating the control element from the radiation material which comprises the plate, the spectral responses of the control element and the plate, as well as the manner in which both respond to temperature and other ambient conditions, are assured of being identical. The control element is disposed within the electrographic copier in such a manner as to be exposed simultaneously with the electrographic plate. Preferably, the illuminating source intensity and/or duration is controlled by the output of the control device. The method of the invention generally comprises the steps of simultaneously exposing the control element and electrographic plate, both having substantially the same spectral response, to at least a portion of the radiation pattern to be recorded on the electrographic plate, thereby causing a current to flow through the radiation-sensitive layer of the control element corresponding to the brightness of the original document or film, sensing the current flow, and changing the exposure parameters, preferably illumination source intensity and/or exposure time, in response to the amplitude of such current flow.

Figure 2:
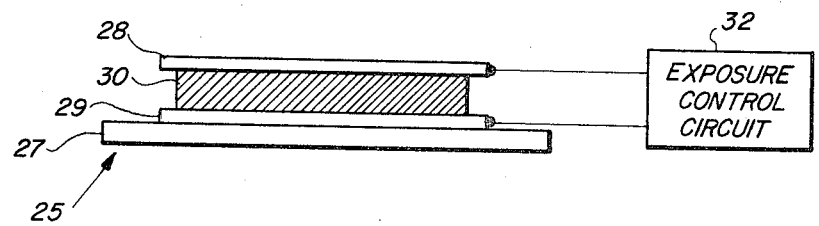
Figure 3:
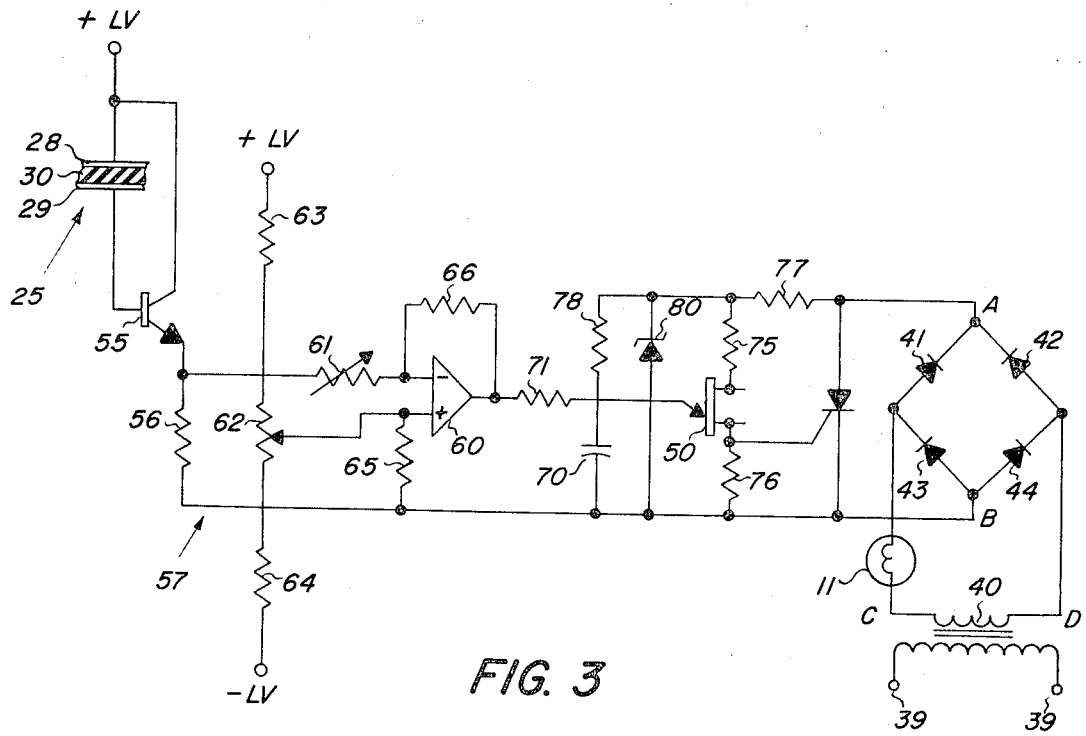
Figure 4:
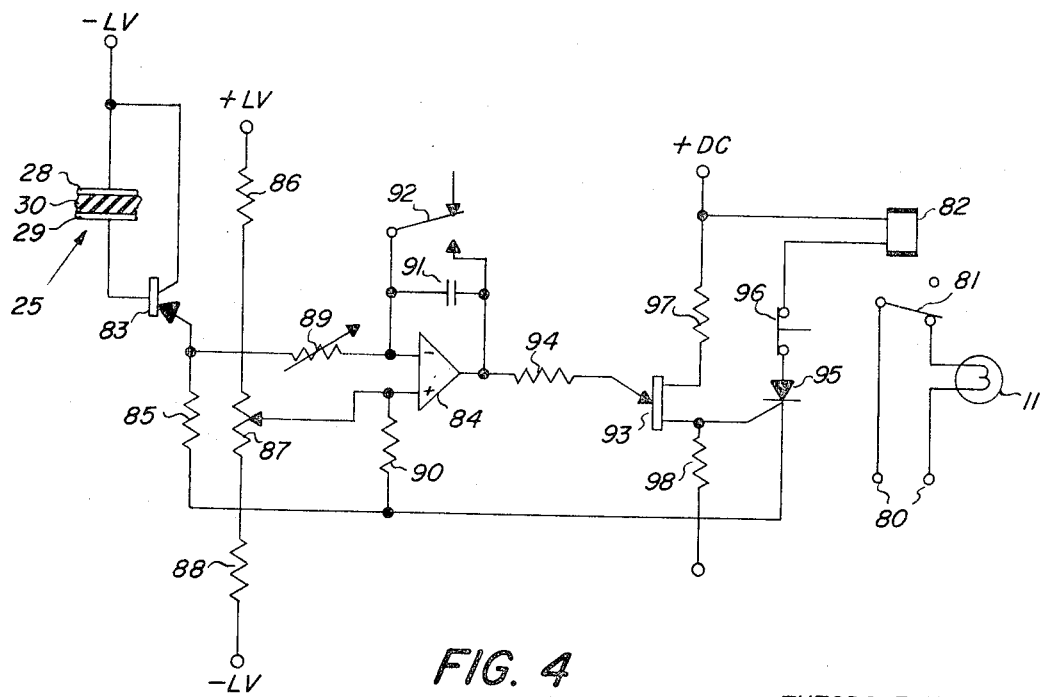

The various objects and advantages of the present invention can best be understood from the ensuing detailed description of preferred embodiments, reference being made to the attached drawings in which:

FIG. 1 is a schematic illustration of the exposure station of an electrographic copier embodying the invention;

FIG. 2 is a sectional view of the radiation-sensitive element of the exposure control device comprising the invention according to a preferred embodiment; and FIGS. 3 and 4 are electrical schematics illustrating various preferred circuits for controlling the intensity of the illuminating source and exposure time, respectively, in accordance with the brightness of the document or film being reproduced.

Referring now to FIG. 1 wherein an electrographic exposure station 10 is illustrated schematically, radiation from an incandescent lamp 11 or other source of radiant energy is reflected by reflector 12 to illuminate original document 13, and an image thereof is projected by lens 14 on the uniformly charged radiation-sensitive surface of an electrographic plate 15. In electrophotographic copiers, plate 15 generally comprises a conductive support 16 having a photoconductive layer 17 disposed thereon. In xerothermographic and thermoxerographic copiers, layer 17 usually comprises a resinous material having a conductivity which varies with the quantity of thermal energy incident thereon. Exposure of plate 15 can be controlled by varying the intensity of lamp 11, the aperture size of projecting lens 14, the exposure time provided by shutter 18 or the on-off period of lamp 11, or any combination of such exposure parameters.

Disposed in the path of light rays emanating from the illuminated original and passing through projecting lens 14 is a beam-splitter or partially silvered mirror 19 arranged in an angular position to reflect a portion of such light rays upon a radiation-sensitive control element 25 which forms a part of the exposure control device of the invention. As best shown in FIG. 2, element 25 is a sandwich-like structure comprising a support 27, and a pair of electrically conductive layers 28 and 29, between which is disposed, in electrical contact therewith, a radiation-sensitive material 30, such as a photoconductive material. Radiation-sensitive material 30 has substantially the same spectral response as layer 17 of the electrographic plate and, preferably, comprises the same radiation-sensitive substance as that from which layer 17 of the electrographic plate is fabricated. Conductive layer 28 and 30 must, of course, be sufficiently transparent as to permit the radiation-sensitive layer 30 of the control element to be imagewise exposed to the original document.

Preferably, conducting layers 28 and 29 are evaporated layers of gold or nickel. The radiation-sensitive layer 30 is preferably a heterogeneous photoconductive layer which comprises an organic photoconductor, such as 4,4'-diethylamino-2,2'-dimethyltriphenylmethane dissolved in a bisphenol A polycarbonate binder, sensitized with 2,6-diphenyl-4,(4-dimethylaminephenyl)thiapyrylium perchlorate.

During imagewise exposure of the electrographic plate, an electrical potential is established between conductive layers 28 and 29 by an exposure control circuit 32. In this manner, a current is caused to flow between conductive layers 28 and 29, the magnitude of which is directly proportional to the potential difference established between these layers and the illumination received by the radiation-sensitive layer 30. Since element 25 is positioned to intercept a portion of all light rays emanating from the original document toward the electrographic plate, the current flowing between layers 28 and 29 will depend upon the average brightness of the illuminated original document.

The current flow through layer 30 is sensed by exposure control circuit 32, the output of which can be used, in a manner hereinafter described, to increase or decrease plate exposure. Thus, since the output of the exposure control circuit 32 is a function of current flow through element 25, which in turn is dependent upon the brightness of the original, the exposure received by the electrographic plate 15 will be governed by the brightness of the original.

The advantages derived from using as the radiation-sensitive element of the exposure control device, a material having precisely the same spectral response as that of the electrographic plate, are obvious. For instance, should the color temperature of lamp 11 shift for any reasons, thereby causing a corresponding shift in the spectral distribution of energy emanating therefrom, the exposure control device will respond to the new spectral distribution of lamp energy in the same manner as the electrographic plate. Moreover, should the background areas of the original document vary in color from document to document, the exposure control device will be affected by such a color change to the same extent as the plate, causing the device to vary exposure to an appropriate level.

In addition to the above advantages, another advantage derived from using as the radiation-sensitive element of the exposure control device the same radiation-sensitive material which comprises the electrographic plate, is that both the exposure control device and the plate will respond identically to variations in ambient operating temperature. Thus, any change in plate speed produced by changes in operating temperature will be compensated for by element 25.

In FIG. 3 a circuit is illustrated which is designed to control the intensity of lamp 11 in response to the current flowing through the radiation-sensitive layer of control element 25 during plate exposure. Lamp 11 is electrically connected to a voltage source 40 having sufficient capacity to handle the power requirements of the lamp. Connected in series with the lamp and source 40 is a bridge rectifier comprising diodes 41, 42, 43 and 44, together with a silicon-controlled rectifier (SCR) 45. Assuming a negligible voltage drop across the rectifiers, the lamp 11 burns with full brightness whenever SCR 45 is conducting. The operation of SCR 45 will be discussed hereinafter. Voltage source 40 is conveniently the secondary winding of a transformer, the primary winding 39 of which is connected to a conventional 115 volt, 60,cycle electric power line through a timer if desired to control exposure time. To understand the operation of the bridge rectifier, consider that during one half-cycle of the applied input voltage, point D is positive with respect to point C. Diode 42 conducts, as its anode is positive with respect to its cathode, putting a positive potential on the anode of SCR 45. Assuming for the moment that SCR 45 is permitted to conduct by the condition of its gate, it conducts with negligible voltage drop, putting its cathode at the same potential as its anode. Point B. is then at the same potential as is point A. Diode 43 conducts, putting the full voltage of winding 40 across lamp 11. On the opposite half-cycle, when point C is positive with respect to point D, the situation is reversed, and diodes 44 and 41 conduct, making the cathode of SCR 45 negative with respect to its anode. This again puts the full voltage of winding 40 across lamp 11, but of the opposite polarity, which is of no consequence for an incandescent lamp.

The operation of a silicon-controlled rectifier is very similar to that of a thyratron. It conducts current between anode and cathode only when the anode is positive with respect to the cathode and a positive current is caused to flow into the gate. It does not conduct, once turned off, unless the current flowing into the gate rises above a certain predetermined level. When it starts conducting, it conducts at full current regardless of the current flowing into the gate, until the anode voltage is made zero or negative with respect to the cathode. When these conditions occur, and the current into the gate is sufficiently low, the anode current is cut off and remains cut off until the anode again becomes positive and the gate current is made sufficiently large to make conduction possible. When the SCR is conducting, it presents a short circuit to the output of the bridge rectifier circuit, making the lamp 11 the entire load for the winding 40. Since a cyclic d.c. voltage is being placed across the SCR 45, the SCR conducts for a given portion of each cycle determined by the time in the cycle at which it is switched on by the unijunction transistor 50. The unijunction transistor is, in turn, controlled in a manner which will now become apparent.

Reflected light from lamp 11 is caused to be incident on the radiation-sensitive layer 30 of element 25. Element 25 is connected between a source of low voltage as indicated and the base of transistor 55. The collector of transistor 55 is also connected to a source of low potential, which can be the same as that applied to the radiation-sensitive element for convenience, but need not be the same. When light from lamp 11 is reflected by document 13 to illuminate element 25, current flows through the element, through the base-emitter junction of transistor 55, and through emitter resistor 56 to a reference voltage point or level 57. Transistor 55 is connected as an emitter follower, so that its output appears as a voltage between the emitter and reference point 57. As the reflected light intensity layer 30 increases, the emitter of transistor 55 becomes more positive, because of the increased voltage drop across resistor 56 produced by the increased emitter current. This positive-going voltage is applied to the negative input of an operational amplifier 60 through gain-adjusting resistor 61. Since the particular amplifier selected for use in the circuit inverts the direction of a signal applied to its negative input, a negative-going signal appears at its output. The level of the output is determined by the potential of the positive input. As can be seen, this is adjusted by means of variable resistor 62 connected in voltage divider 62, 63 and 64. Resistor 65 is used to control the adjustment sensitivity of the voltage applied to the positive input. Resistor 66 is a feedback resistor which serves to stabilize the amplifier and which, together with resistor 61, determines its gain. The output of amplifier 60 charges capacitor 70 through a suitable resistance 71 which serves to prevent capacitor 70 from discharging through the amplifier at an excessive rate. The negative-going signal from amplifier 60 is applied to the gate of unijunction transistor 50, whose operation will now be briefly discussed.

A unijunction transistor can be considered as a resistive element with connections made to its ends, which are called bases. The third terminal or gate is typically considered as if it were connected through a diode junction having its cathode at a point on this resistance approximately 0.6 of the way from the lower base to the upper base. The gate serves to control the flow of current between the bases. When the voltage applied to the gate is more negative than the potential at the point on the interbase resistance at which the gate is considered to be attached, the transistor conducts with a very small current between its bases. As the voltate applied to the gate increases to the value of the inter-base potential at the point of gate attachment, the transistor abruptly starts to conduct a larger current between its bases. The unijunction transistor thus translates a waveform having a relatively low slope into one having a much steeper slope. Resistor 75 limits the current the transistor is permitted to pass, in order to keep its dissipation within limits. The voltage at the gate of the SCR, in the absence of illumination on element 25, is substantially the same as that of the cathode, since unijunction transistor 50 is conducting at a very low current, and therefore only a small current is flowing through resistor 76 to raise the voltage of the gate of SCR 45. When the unijunction conducts more heavily, the voltage of the lower base is raised to a more positive level because of the increased current flow through resistor 76. This voltage is applied to the gate of the SCR, as was seen previously, producing an increase in SCR gate current and thereby causing the SCR to conduct abruptly and at full value, when the signal at the gate of the unijunction transistor reaches a predetermined position level. This level, in turn, is determined by the output level of amplifier 60 taken together with the output from the bridge rectifier circuit.

To understand how these cooperate to control the lamp brightness, consider initially that the instantaneous input voltage from the line 39 is zero. The lamp 11 receives no voltage and the SCR 45 is not conducting. As the instantaneous line voltage increases, in either direction, the anode of SCR 45 becomes positive. This voltage is applied to capacitor 70 through resistors 77 and 78. Generally, resistor 78 is somewhat larger than resistor 77, so that the contribution of resistor 77 can be ignored. Capacitor 70 charges, with a time constant equal to the product of the resistance of resistor 78 and the capacitance of capacitor 70. This time constant must be small enough that the voltage on capacitor 70 rises rapidly to the level required to cause conduction of the unijunction transistor. At a predetermined time, depending on the circuit constants, the unijunction transistor starts to conduct more heavily. The increased voltage across resistor 76 resulting from the increased conduction causes an increase of current into the gate of SCR 45, causing it to conduct. It continues to conduct until its anode again reaches zero volts, at the end of the input half cycle of the line voltage. The process then repeats. Capacitor 70 discharges through resistance 76 for as long as the unijunction transistor remains conducting.

The operation of the lamp can now be understood. The voltage applied to the lamp consists of a series of pulses of alternating current. The duration of the pulses is determined by the fraction of a line voltage half-cycle during which the SCR conducts. The lamp receives full voltage when the SCR is conducting, and no voltage the rest of the time. Since it is the nature of incandescent lamps that the output intensity remains relatively constant for supply voltage frequencies of higher than about 50 cycles per second, the lamp acts as an averaging device, burning at an intensity determined by the time average of the instantaneous voltages applied to it. The two remaining elements in the circuit are zener diode 80 and its associated resistor 77. The diode functions to limit the maximum amplitude of the signal applied to the gate of the unijunction transistor. When the amplitude on the cathode of diode 80 exceeds the zener voltage, the diode conducts and maintains that voltage. This has the effect to producing a junction transistor and steepening the leading edge of the waveform, so that the turn-on point of the unijunction transistor is controlled with more certainty. Resistor 77 limits the current the zener diode is permitted to conduct to keep its dissipation within the ratings.

Returning to the output signal from amplifier 60, it has been seen that an increase in light level on element 25 causes a decrease in the output potential of amplifier 60, that is, it produces a negative-going signal. This light-produced signal, which can be considered to be a "fixed bias", is added algebraically to the instantaneous value of the cyclically varying signal derived from the rectifier circuit by way of resistor 78. Together, they determine the instantaneous voltage on the gate of the unijunction transistor, and thus the turn-on point of the SCR. The increase in light level lowers the "fixed" bias on the gate of the unijunction transistor, causing the unijunction transistor to conduct at a later time in the input cycle of the signal received from the bridge rectifier. The SCR therefore starts to conduct at a later time in the cycle, and the lamp receives a lower value of average voltage, resulting in a lower light output. Following the same reasoning, it will be seen that a decrease in light level incident on control element 25 results in a longer time of conduction of the SCR and hence a greater effective value of voltage on lamp 11, which tends to counteract the decrease in light level.

The operations performed with the circuit of FIG. 2 can equally well be carried out using vacuum tube circuits. The principal difference is in the input section of the circuit. Since the vacuum tube is a voltage responsive device whereas the transistor is a current responsive device, means must be provided to present a voltage at the grid of the input vacuum tube. This is accomplished readily by connecting the grid to the reference level through a high resistance in the conventional manner, connecting one terminal of the device to the grid terminal, and applying the voltage source which causes photo-current to flow in response to illumination across the grid resistor and photoconductive device in series, operational amplifiers using vacuum tubes are known, and can be substituted directly taking into account the necessary differences in supply voltage requirements. The unijunction transistor can be dispensed with, as it is needed in the circuit in FIG. 2 principally because the SCR requires a steeply rising waveform to turn it on reliably, while a thyratron, the vacuum tube equivalent of the SCR, turns on readily from the direct output of the operational amplifier.

FIG. 4 is a schematic diagram of one form of apparatus which is adapted to control the time of exposure of the photosensitive element to the actinic radiation. A source of radiation or lamp 11 is electrically connected to a source of voltage 80 having sufficient capacity to handle the power requirements of the lamp. The lamp 11 is controlled by the position of normally closed contacts 81 of relay 82, which is actuated by circuitry in a manner which will become apparent upon consideration of the operation of the entire circuit. Light from the lamp 11 is caused to be reflected to the radiation-sensitive layer 30 of element 25 in the same manner considered in connection with FIG. 3. Element 25 is connected between a source of low voltage as shown and the base of transistor 83. Transistor 83 is a pnp transistor for proper operation of the circuit shown, whereas transistor 55 in FIG. 3 is an npn transistor. The remaining connections to the input of amplifier 84, that is, resistors 85, 86, 87, 88, 89 and 90 are identical to those in FIG. 3, and need not be discussed further. When reflected light from lamp 11 is caused to shine on element 25, the emitter of transistor 83 is caused to become more negative, by analogy with FIG. 3. A stepwise increase in negative voltage then appears at the input to amplifier 84 corresponding to the stepwise increase in light level. Capacitor 91, when not shorted by contacts 92 of relay 82, converts amplifier 84 into an integrator, as is well known in the computer art. A linearly increasing voltage then appears at the output of amplifier 84, the rate of increase of which is controlled by the absolute change in the voltage at the input of the amplifier, which in turn is controlled by the absolute change in the voltage of the emitter of transistor 83. This increasing voltage is applied to the gate of unijunction transistor 93 through optional protective resistor 94. As has been explained in connection with FIG. 3, the unijunction transistor starts to conduct when the voltage of its gate reaches a value which is approximately six-tenths of the voltage difference between its bases added to the voltage of the lower base. When the unijunction transistor conducts, its lower base becomes more positive, producing an increase of gate current into SCR 95, causing it to conduct, actuating relay 82, and turning the lamp off. Since, for the amplifier 84 to operate as an integrator, capacitor 91 must be unshorted and the lamp must be on, it will be seen that relay section 81 must be a normally closed section, and the relay must be energized except during the exposure interval. Switch 96 is a normally closed, push-to-open and spring return switch. Just prior to the start of an expose cycle, then, the relay 82 is energized since SCR 95 is conducting. Integrating capacitor 91 is shorted, holding the level of the output of amplifier 84 at that of the negative amplifier input. The output level is adjusted by adjusting the positive input by means of resistor 68 to such a value that the current into the gate of SCR 95 is limited, through unijunction transistor 93, to a value such that the SCR would cease to conduct if its anode circuit were to be opened and reclosed. To initiate an exposure cycle, the anode circuit is opened by means of momentary push-to-open switch 96. This releases the relay 82, closing the circuit to lamp 11 through relay section contacts 92, which are normally closed. Simultaneously, contacts 81 are opened, permitting the integrator to operate. As light from lamp 11 shines on control element 25, a linearly increasing voltage appears at the gate of unijunction transistor 93 by means of the steps already outlined. When the gate voltage reaches the value required to cause conduction, the unijunction transistor conducts suddenly, producing a steep positive step voltage at its lower base, which is connected to the gate of the SCR 95. The SCR abruptly conducts, actuating relay 82, which turns the lamp off and short circuits the integrating capacitor 91 in preparation for the next expose cycle.

In order to understand how the circuit of FIG. 4 compensates for changes in the level of the light incident on control element 25, consider that an incremental decrease in light takes place, such as would occur if a colored filter, for example, were to be placed in the exposing beam. A lower level of light produces a lower emitter current in transistor 83, causing the voltage on the emitter to become less negative because of the lower voltage drop across resistor 85. This reduced negative voltage appears at the input of amplifier 84. The voltage level at the output of amplifier 84 then increases at a slower rate, raising the voltage of the gate of unijunction transistor 93 at a slower rate. A longer time is thus required before unijunction transistor 93 conducts and causes SCR 95 to conduct. When SCR 94 does conduct, relay 82 is actuated, terminating the exposure and shortcircuiting capacitor 91 in preparation for the next expose cycle.

By a similar line of reasoning, it can be seen that an incremental increase in the level of the light serves to produce a correspondingly shorter exposure time.

It has been observed in connection with the time control embodiment of the invention described and illustrated in FIG. 4 that the lamp control relay is energized when the lamp is off. This is for purposes of illustrating a particular embodiment of the invention only, and it will be obvious, of course, to those skilled in the art that other embodiments and variations can be used, including those in which the relay is energized during exposure, or even embodiments not using relays, and all such alternative embodiments are intended to be encompassed by the invention. Likewise, with respect to FIG. 3, other variations producing the same or equivalent effects can be utilized, and all such embodiments are likewise intended to be encompased by the invention.

The invention has been described in detail with particular reference to certain embodiments thereof, but it will be understood that variations and modifications can be effected within the spirit and scope of the invention.

We claim:

1. In an electrographic copying process wherein an electrographic plate comprising a photoconductive material of predetermined spectral response is sequentially exposed to radiation patterns of varying spectral distributions of energy to form developable images thereon corresponding to such patterns, the improved method of maintaining plate exposure substantially constant for all such radiation patterns, said method comprising:

sensing the intensity of such patterns with a radiation-sensitive element comprising the same photoconductive material as that which comprises the electrographic plate, said element being adapted to provide an electrical output signal having an amplitude proportional to the intensity sensed;

and adjusting the exposure of the electrographic plate in accordance with the amplitude of the electrical output signal.

2. In an electrographic copier comprising means for sequentially exposing an electrographic plate to radiation patterns of varying spectral distribution to form developable images thereon, such plate being comprised of a photoconductive material of predetermined spectral response, the improvement comprising:

exposure control means for maintaining plate exposure substantially constant for all such radiation patterns, said exposure control means comprising a radiation-sensitive control element comprising a photoconductive material substantially identical to that which comprises the electrographic plate, said element being arranged to sense the intensity of such patterns and adapted to provide an electrical output signal having an amplitude proportional to the pattern intensity sensed; and means operatively coupled with said signal and the electrographic plate exposing means for adjusting electrographic plate exposure in accordance with the amplitude of said signal.

3. The invention according to claim 2 wherein said element comprises a pair of spaced electrodes between which said photoconductive material of said element is disposed in electrical therewith, at least one of said electrodes being substantially transparent to said radiation pattern, and said exposure control means further comprises means for applying an electrical potential between said electrodes.

4. The invention according to claim 2 wherein said means for adjusting electrographic plate exposure comprises means for varying the intensity of the radiation patterns.

5. The invention according to claim 2 wherein said means for adjusting electrographic plate exposure comprises means for varying the time during which the plate is exposed to the radiation patterns.

* * * * *